United States Patent
Batarseh et al.

(12) 
(10) Patent No.: US 6,636,430 B1
(45) Date of Patent: Oct. 21, 2003

(54) ENERGY TRANSFER CONCEPT IN AC/DC SWITCH MODE POWER SUPPLY WITH POWER FACTOR CORRECTION

(75) Inventors: Issa Batarseh, Oviedo, FL (US); Wenkai Wu, Orlando, FL (US); Weihong Qiu, Descartes, CT (US); Wei Gu, Orlando, FL (US)

(73) Assignee: University of Central Florida, Orlando, FL (US)

( * ) Notice: Subject to any disclaimer, the term of this patent is extended or adjusted under 35 U.S.C. 154(b) by 10 days.

(21) Appl. No.: 10/207,300

(22) Filed: Jul. 29, 2002

Related U.S. Application Data
(60) Provisional application No. 60/308,740, filed on Jul. 30, 2001.

(51) Int. Cl.$^7$ ............................................... H02M 3/335
(52) U.S. Cl. .................................................... 363/21.01
(58) Field of Search ............................. 363/16, 17, 20, 363/21.01, 21.12, 21.13, 37

(56) References Cited

U.S. PATENT DOCUMENTS

| | | | |
|---|---|---|---|
| 5,434,767 A | 7/1995 | Batarseh et al. | 363/16 |
| 5,508,903 A | 4/1996 | Alexndrov | 363/16 |
| 5,636,106 A | 6/1997 | Batarseh et al. | 363/16 |
| 5,844,787 A | 12/1998 | Fraidlin et al. | 363/21 |
| 5,903,446 A | 5/1999 | Huillet et al. | 363/17 |
| 5,946,201 A | 8/1999 | Kim | 363/21 |
| 5,959,849 A * | 9/1999 | Batarseh et al. | 363/16 |
| 5,991,172 A * | 11/1999 | Jovanovic et al. | 363/21.14 |
| 6,044,002 A | 3/2000 | Van Der Wal et al. | 363/97 |
| 6,046,914 A | 4/2000 | Lauter | 363/37 |
| 6,097,614 A | 8/2000 | Jain et al. | 363/16 |
| 6,108,222 A * | 8/2000 | Liang | 363/48 |
| 6,118,673 A * | 9/2000 | Hua | 363/56.11 |
| 6,122,183 A * | 9/2000 | He et al. | 363/44 |
| 6,266,256 B1 | 7/2001 | Lehnert et al. | 363/37 |

* cited by examiner

Primary Examiner—Adolf D. Berhane
(74) Attorney, Agent, or Firm—Brian S. Steinberger; Law Offices of Brian S. Steinberger, P.A.

(57) ABSTRACT

A new innovative concept in AC/DC cell that transfers energy to the output side directly from the input line, rather than from the storage capacitor in power factor correction (PFC) cell during the period that the line voltage exceeds a preset value. The new concept is based on providing additional winding coupled to the DC/DC transformer connected to the rectified input side to provide a path for the energy transfer from the line to transfer to the output directly (Boost cell) or to be stored in the output transformer (Flyback cell).

20 Claims, 11 Drawing Sheets

ENERGY TRANSFER CONCEPT IN AC/DC SWITCH MODE POWER SUPPLY WITH POWER FACTOR CORRECTION

This application claims the benefit of Provisional Application No. 60/308,746 filed Jul. 30, 2001.

FIELD OF THE INVENTION

This invention relates to new Power Factor Correction (PFC) alternating current/direct current (AC/DC) power supplies and more particularly to those power supplies in which the energy transfers directly from the input line to the output during any period that the input line voltage exceeds a preset value and this invention claims the benefit of priority from United States Provisional Application Serial No. 60/308,740 filed Jul. 30, 2001.

BACKGROUND AND PRIOR ART

A number of national and international standards require that the harmonics of the line current of electronic equipments be limited to certain specified levels. The typical prior art approaches for meeting these requirements are set forth in the patent literature as follows:

U.S. Pat. No. 5,434,767 to Batarseh, et al.; U.S. Pat. No. 5,636,106 to Batarseh, et al.; U.S. Pat. No. 5,844,787 to Fraidlin, et al.; U.S. Pat. No. 6,266,256 to Lehnert, et al.; and, U.S. Pat. No. 6,044,002 to Van Der Wal, et al., however, each are without an additional winding connected to the rectified input side and not arranged to transfer energy to the output directly during the time when the line voltage exceeds a preset value.

Additional background art includes: U.S. Pat. No. 5,508,903 to Alexndrov, et al.; U.S. Pat. No. 5,903,446 to Huillet, et al.; and, U.S. Pat. No. 6,097,614 to Jain, et al. which are each to a DC/DC cell (not for a PFC AC/DC cell); and, U.S. Pat. No. 6,046,914 to Lauter which uses the additional winding connected with the Boost inductor as a voltage feedback sensor to alleviate the voltage across the bulk capacitor.

Thus, it appears from the prior art teachings known to the inventors that the approaches for meeting the harmonics requirements of the line current are either:

1) to add a power factor corrector ahead of the isolated direct current/direct current (DC/DC) cell section of the switching mode power supply (Two-Stage Scheme); or,
2) integrate the function of power factor correction and isolated DC/DC conversion into a single power stage (One-Stage Scheme).

Unfortunately, both of these prior art approaches are characterized by a major disadvantage in that they have inherent low efficiency due to the fact that energy is processed twice during its transferring process. This results in very high switching losses in the main switch.

SUMMARY OF THE INVENTION

It is an important object of this invention to provide a new energy transfer concept to improve the efficiency of power factor correction AC/DC cells.

It is a further object of this invention to reduce the high switching losses of the main switch.

According to the invention, there is a power factor cell constructed ahead of the current-fed DC/DC conversion cell, and an additional winding coupled to the DC/DC transformer is connected to the rectified input side and arranged to transfer energy to the output directly during the line voltage exceeds preset value. Therefore, the efficiency of the cell can be improved considerably due to the reduced power processing time.

According to the invention, the power factor cell can operate both in continuous current mode (CCM) or discontinuous current mode (DCM). The power factor correction cell and current-fed DC/DC cell cell can share a common switch with single control loop or use different switches with separate control loops.

Other features, objects and advantages of the invention will become apparent from the following detailed description when read in connection with the accompanying drawings.

BRIEF DESCRIPTION OF DRAWINGS

Details of the invention, and of preferred embodiments thereof, will be further understood upon reference to the drawings, wherein:

FIG. 5b is a schematic that uses the Flyback transformer to replace the Boost inductor in FIG. 5a.

FIG. 6b is a schematic that uses the Flyback transformer to replace the Boost inductor in FIG. 6a.

FIG. 7b is a schematic that uses the Flyback transformer to replace the Boost inductor in FIG. 7a.

FIG. 8b is a schematic that uses the Flyback transformer to replace the Boost inductor in FIG. 8a.

DETAILED DESCRIPTION OF PREFERRED EMBODIMENTS

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

Figure 1:
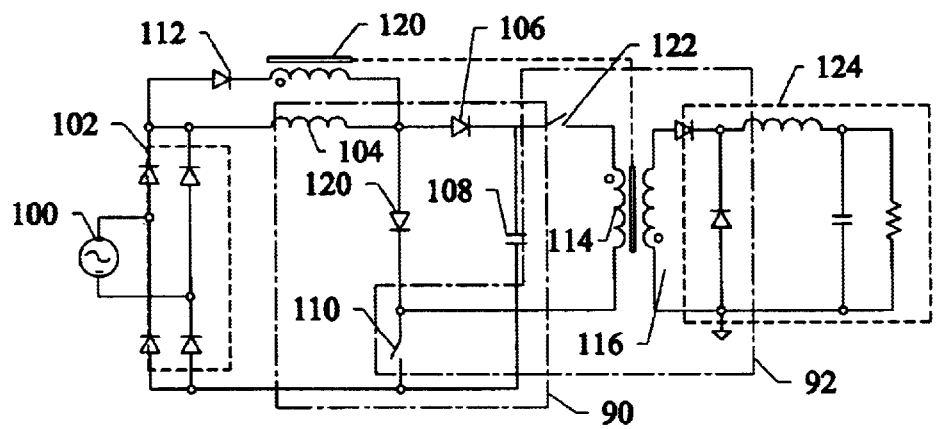
FIG. 1 illustrates a schematic illustrative of the invention.

Refer now to FIG. 1 which shows a block diagram schematic of the invention. This power factor corrected switch mode power supply of the invention has a power factor correction (PFC) cell 90 followed by a current fed DC/DC cell cell 92. The AC line power 100 applied to the input terminals is rectified by the four-diode bridge 102 before the input of PFC cell 90. One terminal of the additional winding 120 coupled with the DC/DC transformer 114 is connected to the rectified output side of bridge 102 through a diode 112. The other terminal of 120 is connected directly to the DC/DC stage, normally connected to the power switch 110, shared with DC-DC stage. In this latter circuit, the extra winding 120 will be blocked by diode 112 when the output voltage of rectifier 102 is less than a preset value. The preset voltage is a value which is defined by the ratio of the nember: of windings 120 divided by the number of windings 114 times the voltage across the capacitor 108, i.e. ($N_{120}/N_{114}$ $V_{108}$) When the output voltage of rectifier bridge 102 exceeds this preset value, winding 120 will power the output 124 through the coupling winding 116, and winding 114 will be blocked. Since the output of input rectifier 102 is delivered to the output 124 directly, without being buffered by the capacitor 108, the efficiency is improved since the energy process time is reduced.

Figure 2A:
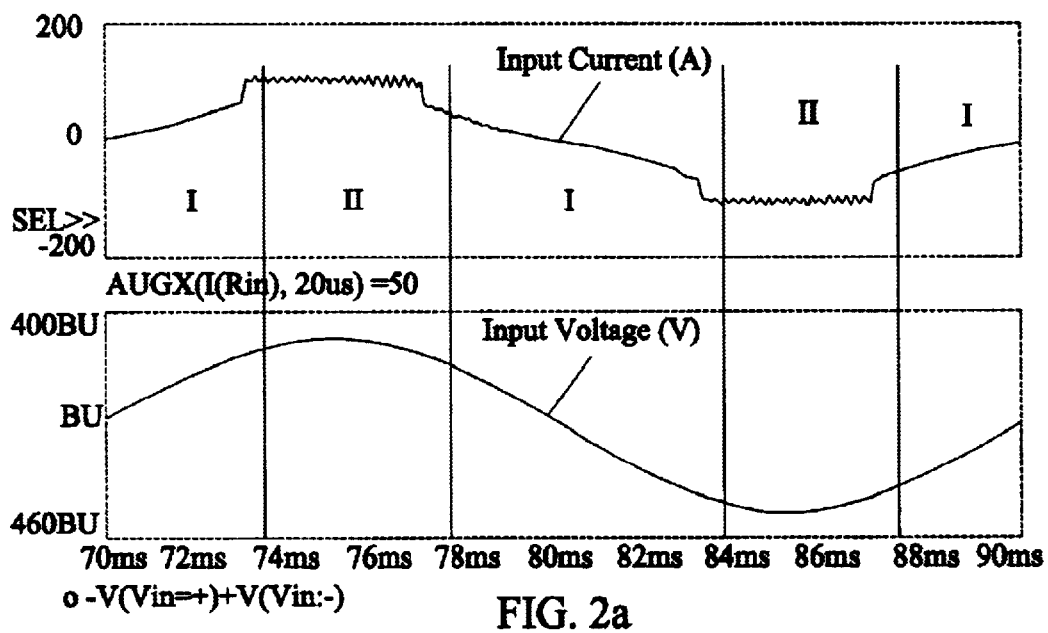
FIG. 2a indicates the input line current and line voltage waveforms, respectively, during period I when the line voltage is lower than the preset value; and during period II when the line voltage exceeds the preset value.
Figure 2B:
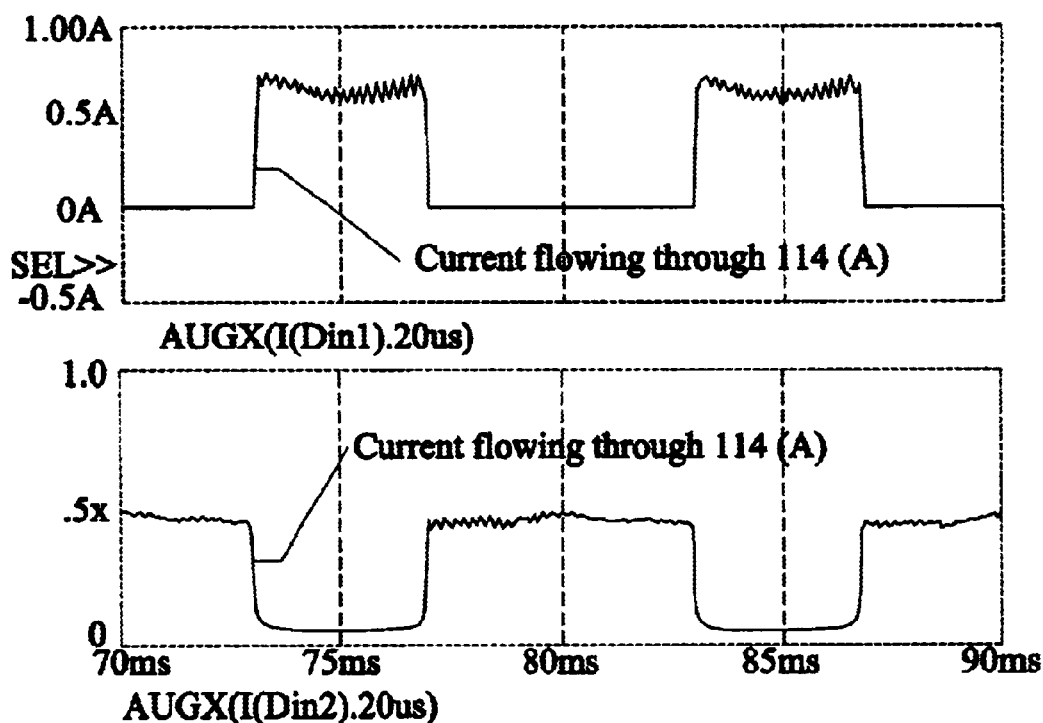
FIG. 2b shows in the upper trace the average current flowing through the additional winding, while the lower trace shows the average current flowing through the DC bus fed winding.
Figure 3A:
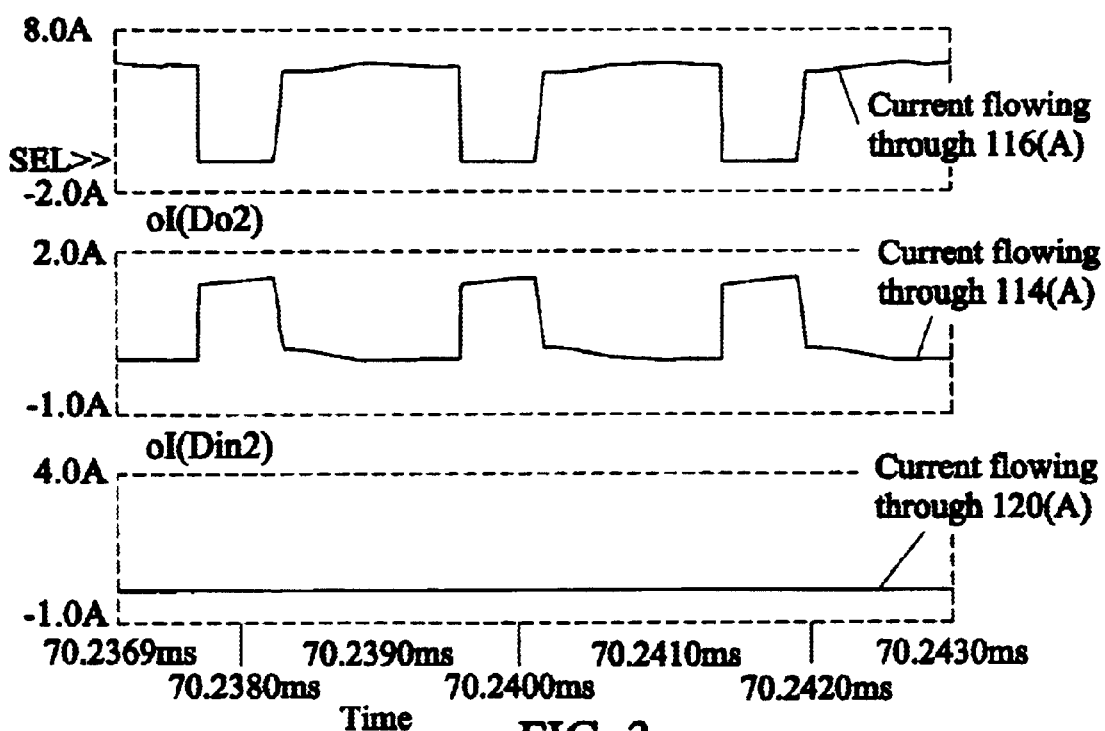
FIG. 3a shows, in period I, the currents flowing, respectively, through the secondary winding (upper trace), through the DC bus fed winding (middle trace) and through the additional winding (lower trace).
Figure 3B:
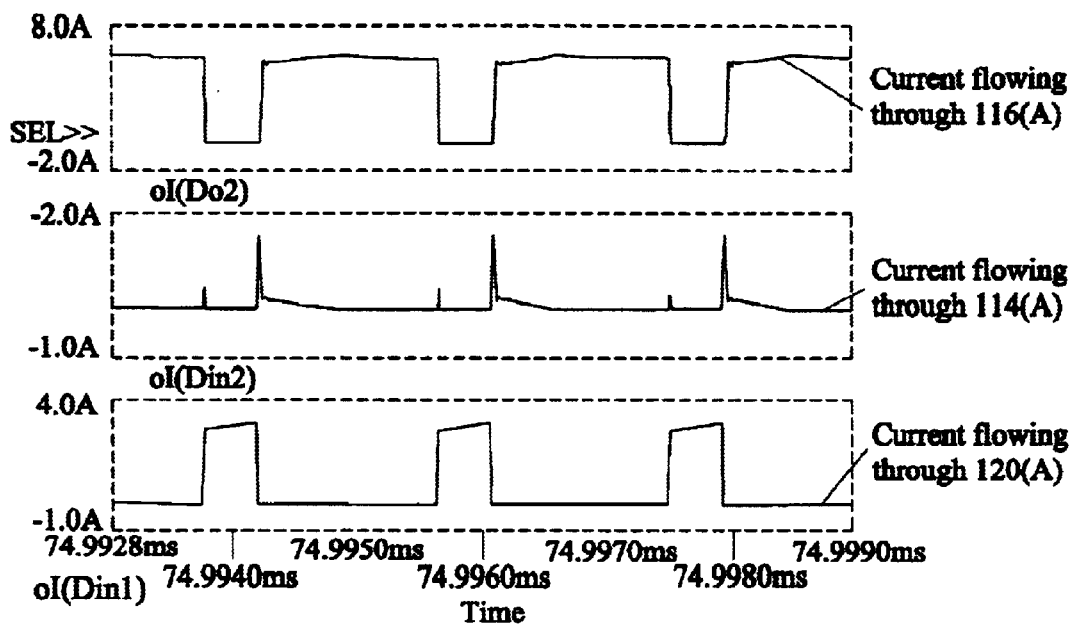
FIG. 3b shows, in period II, the currents flowing, respectively, through the secondary winding (upper trace), through the DC bus fed winding (middle trace) and through the additional winding (lower trace).

FIGS. 2(a) and 2(b) and FIGS. 3(a) and 3(b) show the simulated waveforms for the input current and voltage, respectively, of the hybrid energy transfer cell of the invention. As shown, the energy transfer to the output is done in a hybrid mode: when the line voltage is lower than the preset value (Period I), which is proportional to the voltage of storage capacitor 108, the storage capacitor will power the output side through the winding 114; and, when the line voltage exceeds the preset (Period II), the input power is directly transferred to the secondary side through winding 120, as shown in FIG. 2(b) and FIG. 3(a) and FIG. 3(b). FIG. 2(b) indicates the averaged current flowing through 114 and 120 in one line cycle, FIGS. 3(a) and (b) show the current flowing through 114 and 120 in each switching cycle in period I and II, respectively. Changing the turn ratio of additional transformer winding 120 with respect to the primary winding 114 of the DC/DC transformer can adjust the areas I and II, and substantially adjust the energy share that is transferred to the output directly. Because energy is delivered to the output directly from the line input during II period, without passing the buffering storage capacitor, the efficiency will be improved due to the reduced power processing time.

Figure 3C:
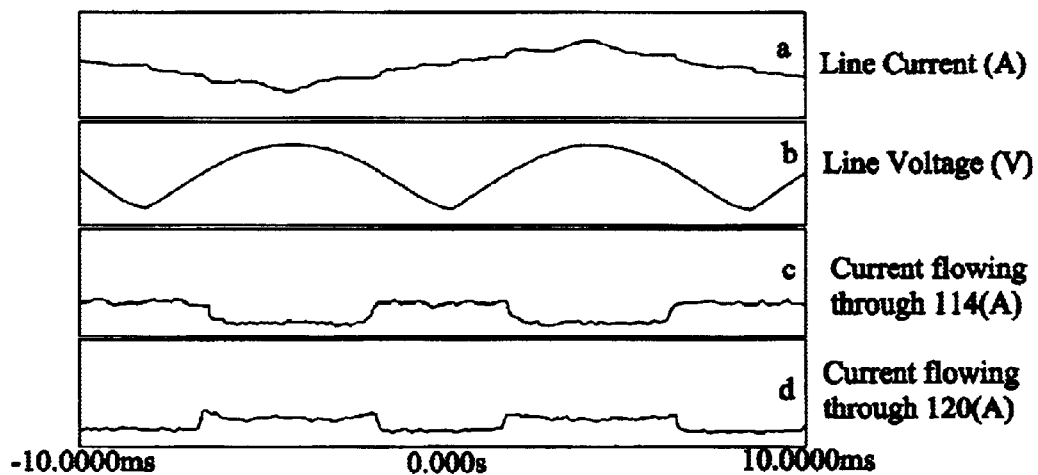
FIG. 3c is the experimental results wherein waveform: a is the input current; b is the input line voltage; c is the current flowing through the additional winding; and, d is the DC bus fed winding.

Refer now to FIG. 3(c) for the resulting experimental results which show that the energy is transferred to the output side directly when the line voltage exceeds the preset value.

Referring to FIGS. 4(a)–4(f), there is shown therein schematic circuit diagrams of some known (Prior Art) widely used PFC cells with the common designations, i.e., FIGS.: 4a is "Boost"; 4b is "SEPIC"; 4c is "Buck-Boost"; 4d is "Cuk"; 4e is "Buck"; and, 4f is a two-switch "Buck Boost", respectively. All of these practical PFC cells can be improved in its effectiveness according to this invention by transferring its input energy directly to the output side. In the subsequent description of these PFC cells, the several components have commonly identified and using a suffix which indicates the particular figure, e.g. rectifier bridge 202a is found in FIG. 4a whereas rectifier bridge 202b is found in FIG. 4b.

Figure 4B:
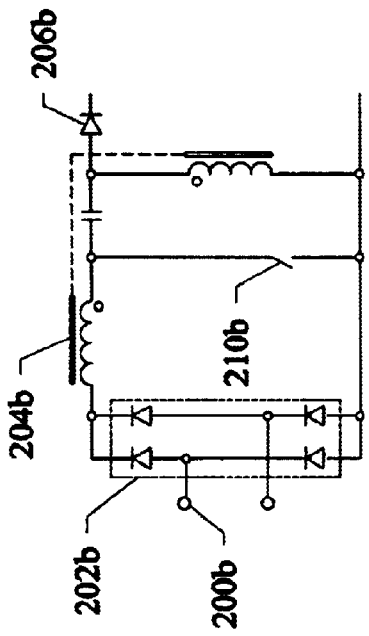
FIGS. 4a, 4b, 4c, 4d, 4e and 4f are schematic circuit diagrams of Boost, Sepic, Buck-Boost, Cuk, Buck and two-switch Buck Boost PFC cells, respectively.
Figure 4D:
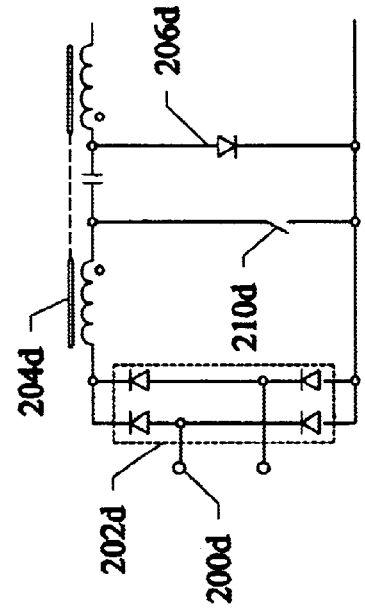
Figure 4A:
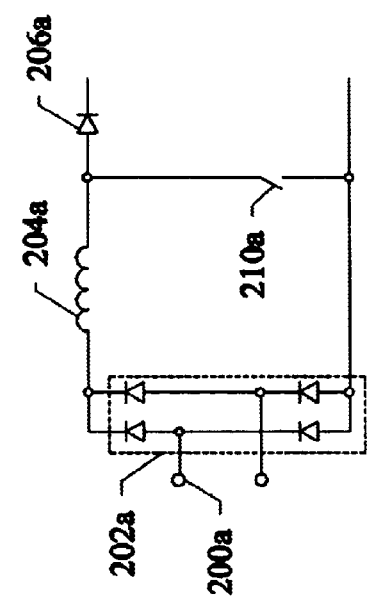

Referring now to FIG. 4a in the Boost PFC cell, the AC energy enters at input nodes 200a, rectified by bridge 202a with the rectified output flowing through inductor 204a and then to diode 206a with a branch to switch 210a.

Referring now to FIG. 4b in the SEPC PFC cell, the AC energy enters at input nodes 200b, rectified by bridge 202b with the rectified output flowing through transformer 204b and then to diode 205b with capacitor separated branches to switch 210b and the coupling winding of transformer 204b.

Figure 4C:
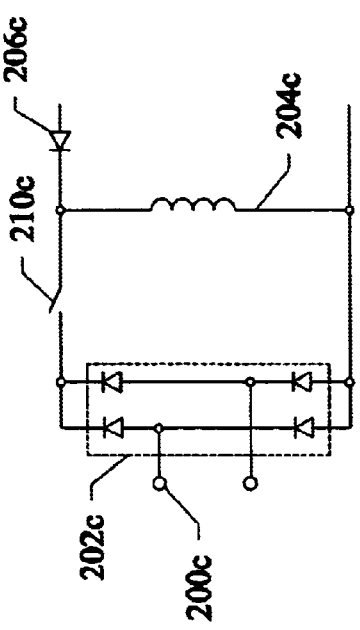

Referring now to FIG. 4c in the Buck-Boost PFC cell, the AC energy enters at input nodes 200c, rectified by bridge 202c with the rectified output flowing through bridge inductor 204c with output diode 206c and switch 210c.

Referring now to FIG. 4d in the Cuk PFC cell, the AC energy enters at input nodes 200d, rectified by bridge 202d with the rectified output flowing through transformer 204d with its windings capacitatively connected and with the rectifier bridge 202d output also bridged with diode 206d and switch 210d.

Figure 4E:
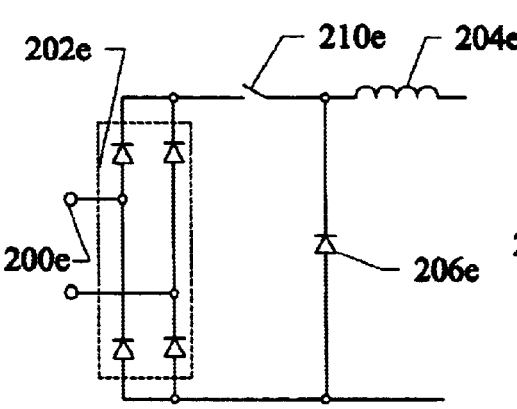

Referring now to FIG. 4e in the Buck PFC cell, the AC energy enters at input nodes 200e, rectified by bridge 202e with the rectified output passing across switch 210e and then flowing through inductor 204e with the rectifier bridge 202d output bridged with diode 206e.

Figure 4F:
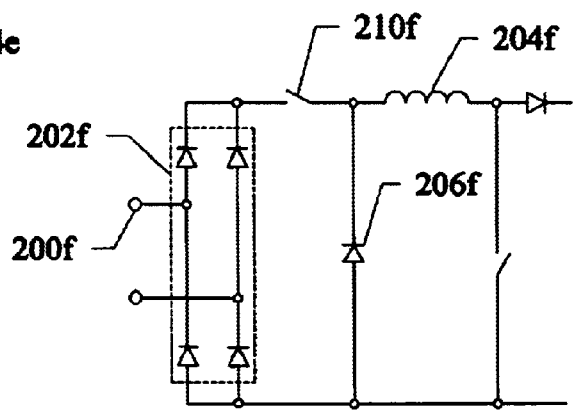

Referring now to FIG. 4f in the two-switch Buck Boost PFC cell, the AC energy enters at input nodes 200f, rectified by bridge 202f with the rectified output passing across switch 210f and then flowing through inductor 204f with the rectifier bridge 202d output bridged with diode 206f and the inductor output branching into a diode and a second switch bridging diode 206f.

All of these practical PFC cells can be improved in its effectiveness according to this invention by transferring its input energy directly to the output through a current fed DC/DC cell cell. As are schematically illustrated in the following FIGS. 5, 6, 7, and 8.

FIGS. 5a to 5d show schematic circuit diagrams of combining a single stage isolated power factor corrected power (PFC) supply topologies reflecting the improvement disclosed in this invention using the Boost PFC cell.

Figure 5A:
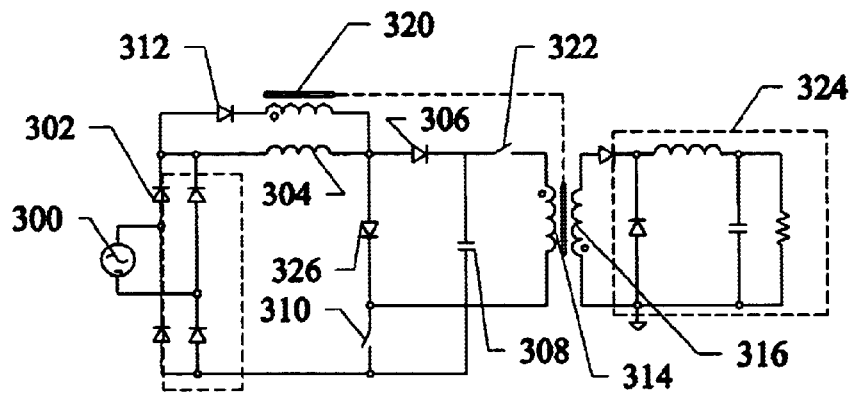
FIG. 5a shows the single stage Flyback cell with the additional energy transferring winding.

In FIG. 5a, the schematic shows the specific topology of combining a Boost PFC with a Flyback transformer modified according to the invention by providing extra winding 320. As shown therein the AC input 300 is applied to rectifier 302, and the rectifier output is connected to inductor 304, diode 306, switch 310 and capacitor 308, indicating a Boost PFC cell. The output of PFC cell is fed to the DC/DC cell, constituted by buffer capacitor 308, switch 310, Flyback transformer 314, 316 and output circuitry 324. Extra winding 320 and diode 312 is parallel connected with the Boost inductor 304.

Figure 5B:
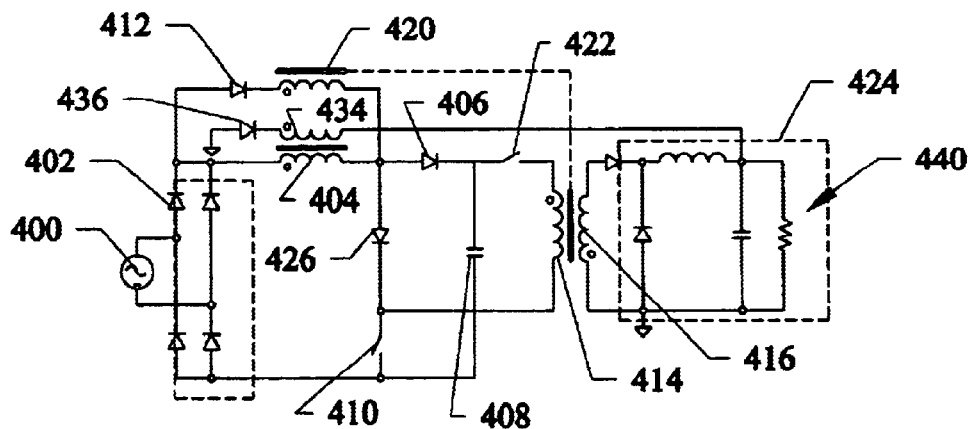

In FIG. 5b, the schematic shows the specific topology of combining a Boost PFC with a Flyback transformer modified according to the invention by providing extra winding 420. As shown therein the AC input 400 is applied to rectifier 402, and the rectifier output is connected to transformer winding 404, diode 406, switch 410 and capacitor 408, indicating a Boost PFC cell. The output of PFC cell is fed to the DC/DC cell, constituted by buffer capacitor 408, switch 410, Flyback transformer 414, 416 and output circuitry 424. Extra winding 420 and diode 412 is parallel connected with the winding 404. Winding 434, which is coupled with 404, is serially connected with diode 436 and thereafter is parallel connected with the output load 440.

Figure 5C:
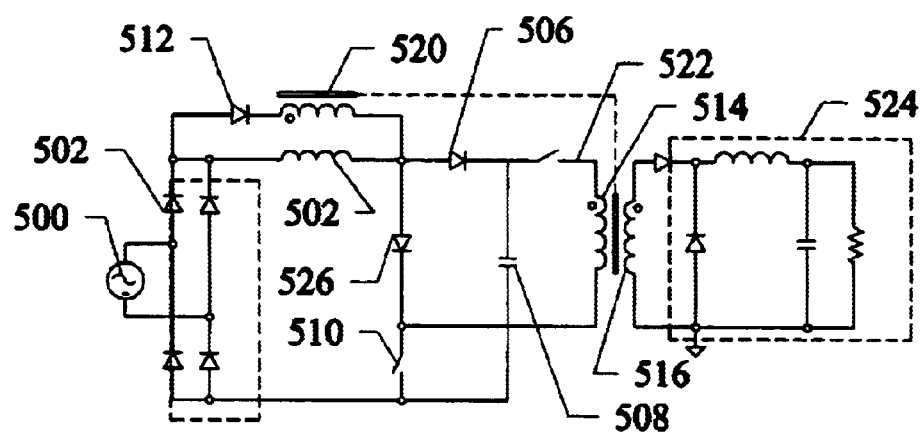
FIG. 5c shows the single stage Forward cell with the additional energy transferring winding.

In FIG. 5c, the schematic shows the specific topology of combining a Boost PFC with a Flyback transformer modified according to the invention by providing extra winding 520. As shown therein the AC input 500 is applied to rectifier 502, and the rectifier output is connected to inductor 504, diode 506, switch 510 and capacitor 508, indicating a Boost PFC cell. The output of PFC cell is fed to the DC/DC cell, constituted by buffer capacitor 508, switch 510, forward transformer 514, 516 and output circuitry 524. Extra winding 520 and diode 512 is parallel connected with the Boost inductor 504.

Figure 5D:
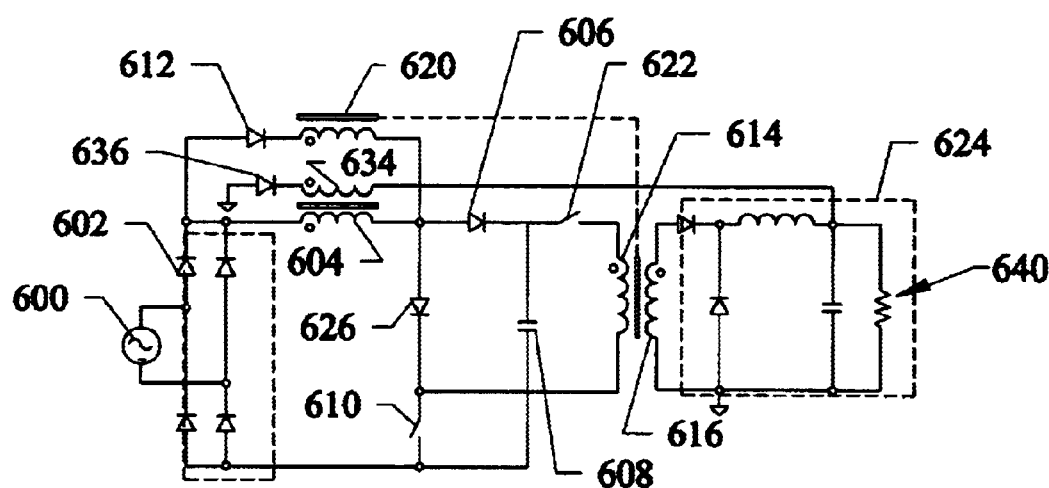
FIG. 5d is a schematic that uses the Flyback transformer to replace the Boost inductor in FIG. 5c.

In FIG. 5d, the schematic shows the specific topology of combining a Boost PFC with a forward transformer modified according to the invention by providing extra winding 620. As shown therein the AC input 600 is applied to rectifier 602, and the rectifier output is connected to transformer winding 604, diode 606, switch 610 and capacitor 608, indicating a Boost PFC cell. The output of PFC cell is fed to the DC/DC cell, constituted by buffer capacitor 608, switch 610, forward transformer 614, 616 and output circuitry 624. Extra winding 620 and diode 612 is parallel connected with the winding 604. Winding 634, which is coupled with 604, is serially connected with diode 636 and thereafter is parallel connected with the output load 640.

Referring to FIGS. 6a to 6d, the schematic circuit diagrams illustrate the invention by showing the incorporation of an additional winding to the topologies combining a Boost PFC with serial/parallel forward and Flyback cell cells, respectively.

Figure 6A:
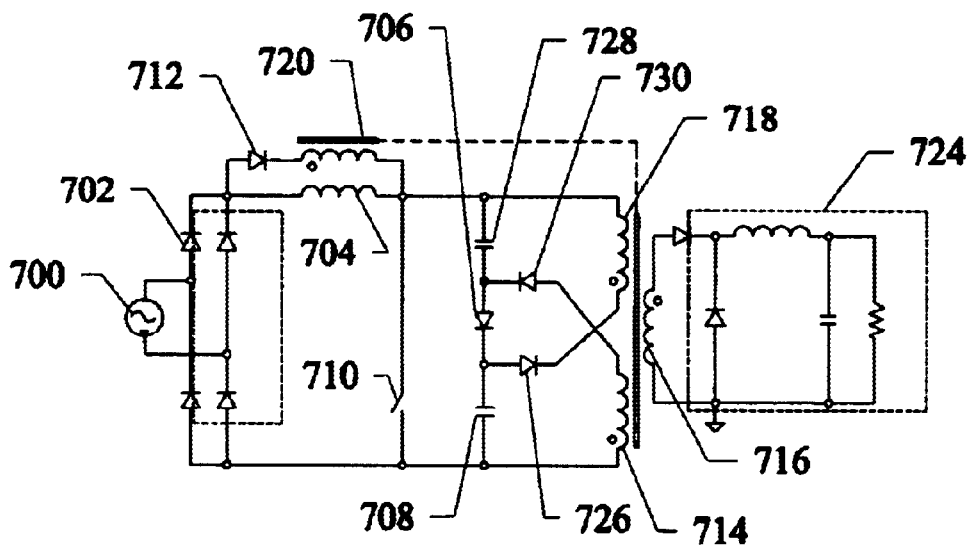
FIG. 6a shows the single switch series/parallel forward cell with the additional energy transferring winding.

In FIG. 6a, the schematic shows the specific topology of combining a Boost PFC with a serial/parallel forward cell modified according to the invention by providing extra winding 720. As shown therein the AC input 700 is applied to rectifier 702, and the rectifier output is connected to inductor 704, diode 706, switch 710 and capacitor 708, 728, indicating the Boost PFC cell. The output of PFC cell is fed to the DC/DC cell, constituted by buffer capacitor 708, 728, switch 710, diode 726, 730, Flyback transformer 714, 716, 718 and output circuitry 724. Extra winding 720 and diode 712 is parallel connected with the Boost inductor 704.

Figure 6B:
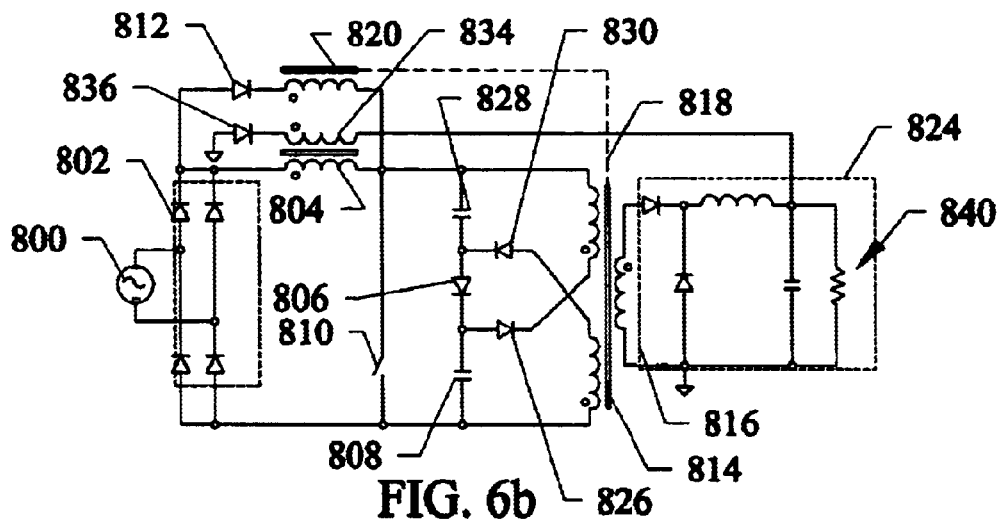

In FIG. 6b, the schematic shows the specific topology of combining a Boost PFC with a serial/parallel forward cell modified according to the invention by providing extra winding 820. As shown therein, the AC input 800 is applied to rectifier 802, and the rectifier output is connected to Flyback transformer winding 804, diode 806, switch 810 and capacitor 808, 828, indicating a Boost PFC cell. The output of PFC cell is fed to the DC/DC cell, constituted by buffer capacitor 808, 828, switch 810, diode 826, 830, Forward transformer 814, 816, 818 and output circuitry 824. Extra winding 820 and diode 812 is parallel connected with the Boost inductor 804. Winding 834, which is coupled with 804, is serially connected with diode 836 and thereafter is parallel connected with the output load 840.

Figure 6C:
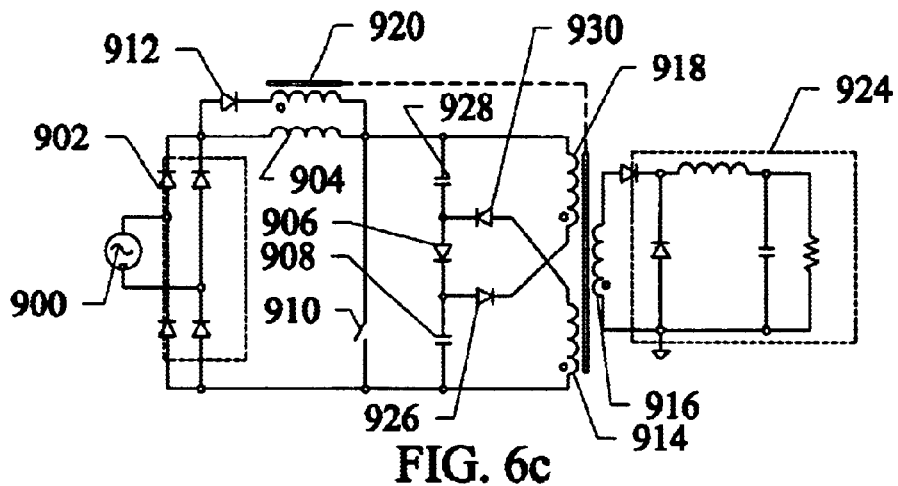
FIG. 6c shows the single switch series/parallel Flyback cell with the additional energy transferring winding.

In FIG. 6c, the schematic shows the specific topology of combining a Boost PFC with a serial/parallel Flyback cell modified according to the invention by providing extra winding 920. As shown therein the AC input 900 is applied to rectifier 902, and the rectifier output is connected to inductor 904, diode 906, switch 910 and capacitor 908, 928, indicating a Boost PFC cell. The output of PFC cell is fed to the DC/DC cell, constituted by buffer capacitor 908, 928, switch 910, diode 926, 930, forward transformer 914, 916, 918 and output circuitry 924. Extra winding 920 and diode 912 is parallel connected with the Boost inductor 904.

Figure 6D:
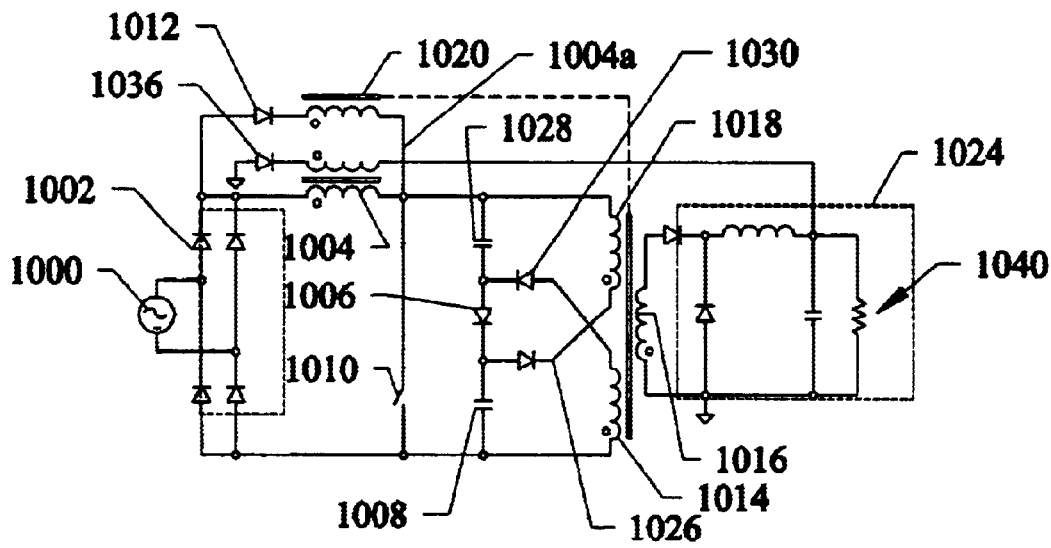
FIG. 6d is a schematic that uses the Flyback transformer to replace the Boost inductor in FIG. 6c.

In FIG. 6d, the schematic shows the specific topology of combining a Boost PFC with a serial/parallel Flyback cell modified according to the invention by providing extra winding 1020. As shown therein the AC input 1000 is applied to rectifier 1002, and the rectifier output is connected to Flyback transformer winding 1004, diode 1006, switch 1010 and capacitor 1008, 1028, indicating a Boost PFC cell. The output of PFC cell is fed to the DC/DC cell, constituted by buffer capacitor 1008, 1028, switch 1010, diode 1026, 1030, Flyback transformer 1014, 1016, 1018 and output circuitry 1024. Extra winding 1020 and diode 1012 is parallel connected with the Boost inductor 1004. Winding 1034, which is coupled with 1004, is serially connected with diode 836 and thereafter is parallel connected with the output load 1040.

The schematic circuit diagrams with added winding to the topologies combining a Buck PFC and a serial/parallel Forward and Flyback cell cells, are shown in FIGS. 7a to 7d, respectively.

Figure 7A:
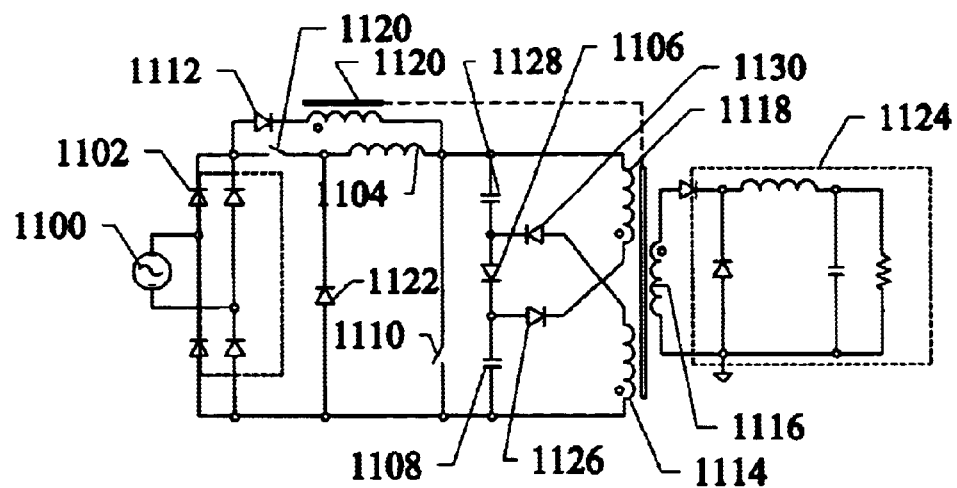
FIG. 7a shows an additional energy transferring winding added to the cell that combines the Buck PFC cell and serial/parallel forward cell.

In FIG. 7a, the schematic shows the specific topology of combining a Buck PFC with a serial/parallel Forward cell modified according to the invention by providing extra winding 1120. As shown therein the AC input 1100 is applied to rectifier 1102, and the rectifier output is connected to inductor 1104, diode 1122, switch 1120 and capacitor 1108 and 1128, indicating a Buck PFC cell. The output of PFC cell is fed to the DC/DC cell, constituted by buffer capacitor 1108, 1128, switch 1110, diode 1126 and 1130, Forward transformer windings 1114, 1116 and 1118 and output circuitry 1124. Extra winding 1120 and diode 1112 is inserted between the switch 1110 and positive output of rectifier 1102.

Figure 7B:
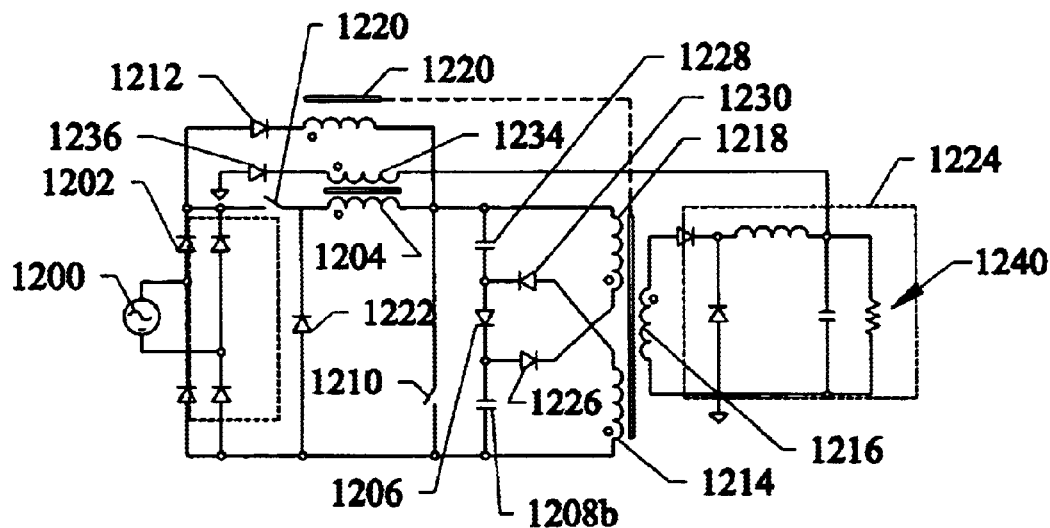

In FIG. 7b, the schematic shows the specific topology of combining a Buck PFC with a serial/parallel forward cell modified according to the invention by providing extra winding 1220. As shown therein the AC input 1200 is applied to rectifier 1202, and the rectifier output is connected to Flyback transformer winding 1204, diode 1222, switch 1220 and capacitor 1208 and 1228, indicating a Buck PFC cell. The output of PFC cell is fed to the DC/DC cell, constituted by buffer capacitor 1208 and 1228, switch 1210, diode 1226, 1230, Forward transformer windings 1214, 1216 and 1218 and output circuitry 1224. Extra winding 1220 and diode 1212 is inserted between the switch 1210 and positive output of rectifier 1202. Winding 1234, which is coupled with 1204, is serially connected with diode 1236 and thereafter is parallel connected with the output load 1240.

Figure 7C:
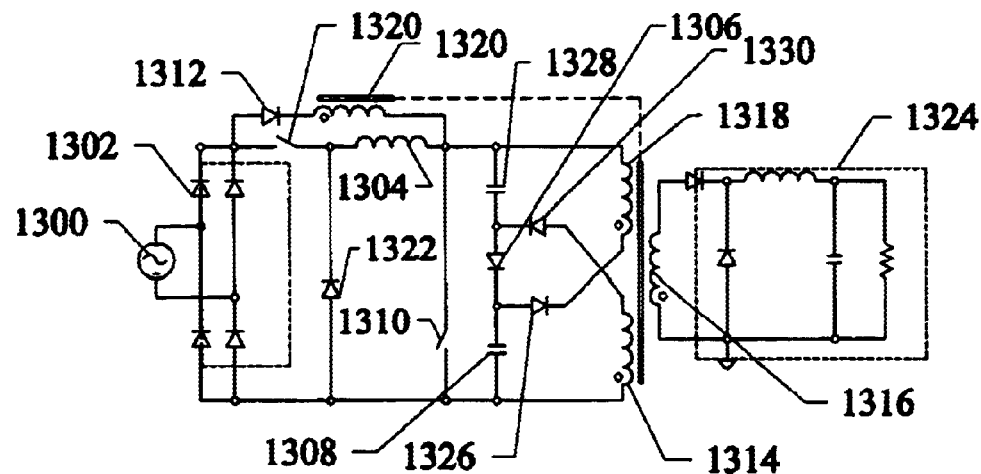
FIG. 7c shows an additional energy transferring winding added to the cell that combines the Buck PFC cell and serial/parallel Flyback cell.

In FIG. 7c, the schematic shows the specific topology of combining a Buck PFC with a serial/parallel Flyback cell modified according to the invention by providing extra winding 1320. As shown therein the AC input 1300 is applied to rectifier 1302, and the rectifier output is connected to inductor 1304, diode 1322, switch 1320 and capacitor 1308, 1328, indicating a Buck PFC cell. The output of PFC cell is fed to the DC/DC cell, constituted by buffer capacitor 1308 and 1328, switch 1310, diodes 1326 and 1330, Flyback transformer windings 1314, 1316 and 1318 and output circuitry 1324. Extra winding 1320 and diode 1312 is inserted between the switch 1310 and positive output of rectifier 1302.

Figure 7D:
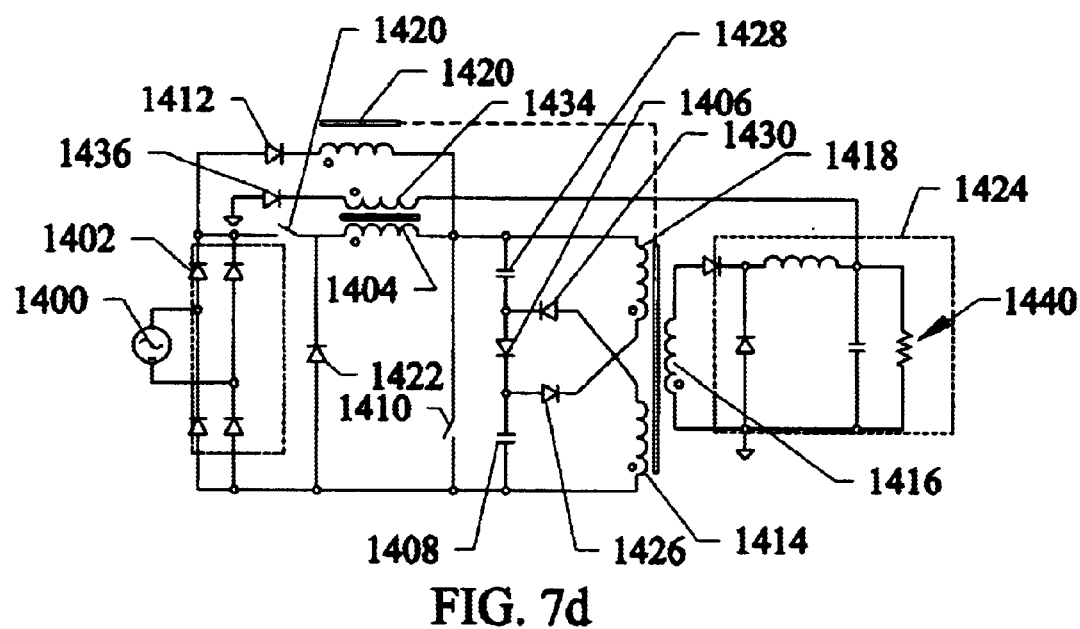
FIG. 7d is a schematic that uses the Flyback transformer to replace the Boost inductor in FIG. 7c.

In FIG. 7d, the schematic shows the specific topology of combining a Buck PFC with a serial/parallel Flyback cell modified according to the invention by providing extra winding 1420. As shown therein the AC input 1400 is applied to rectifier 1402, and the rectifier output is connected to Flyback transformer winding 1404, diode 1422, switch 1420 and capacitors 1408 and 1428, indicating a Buck PFC cell. The output of PFC cell is fed to the DC/DC cell, constituted by buffer capacitors 1408 and 1428, switch 1410, diodes 1426 and 1430, Flyback transformer 1414, 1416 and 1418 and output circuitry 1424. Extra winding 1420 and diode 1412 is inserted between the switch 1410 and positive output of rectifier 1402. Winding 1434, which is coupled with 1404, is serially connected with diode 1436 and thereafter is parallel connected with the output load 1440.

FIGS. 8a to 8d show the schematic circuit diagrams resulting from the addition of an additional winding to the topologies combining a Boost PFC and two switches forward and Flyback cell cells, respectively.

Figure 8A:
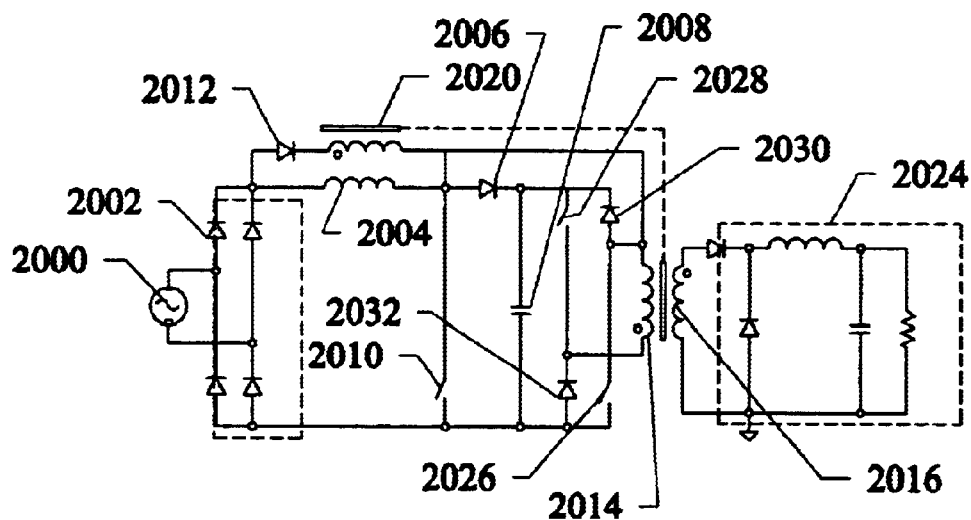
FIG. 8a shows an additional energy transferring winding added to the cell that combines a Boost PFC cell and two switch Forward cells.

In FIG. 8a, the schematic shows the specific topology of combining a Boost PFC with a two switches forward cell modified according to the invention by providing extra winding 2020. As shown therein the AC input 2000 is applied to rectifier 2002, and the rectifier output is connected to inductor 2004, diode 2006, switch 2010 and capacitor 2008, indicating a Boost PFC cell. The output of PFC cell is fed to the DC/DC cell, constituted by buffer capacitor 2008, switches 2026 and 2028, diodes 2030 and 2032, Forward transformer windings 2014 and 2016 and output circuitry 2024. The additional winding 2020 and diode 2012 are inserted between low side switch 2026 and positive output of rectifier 2002.

Figure 8B:
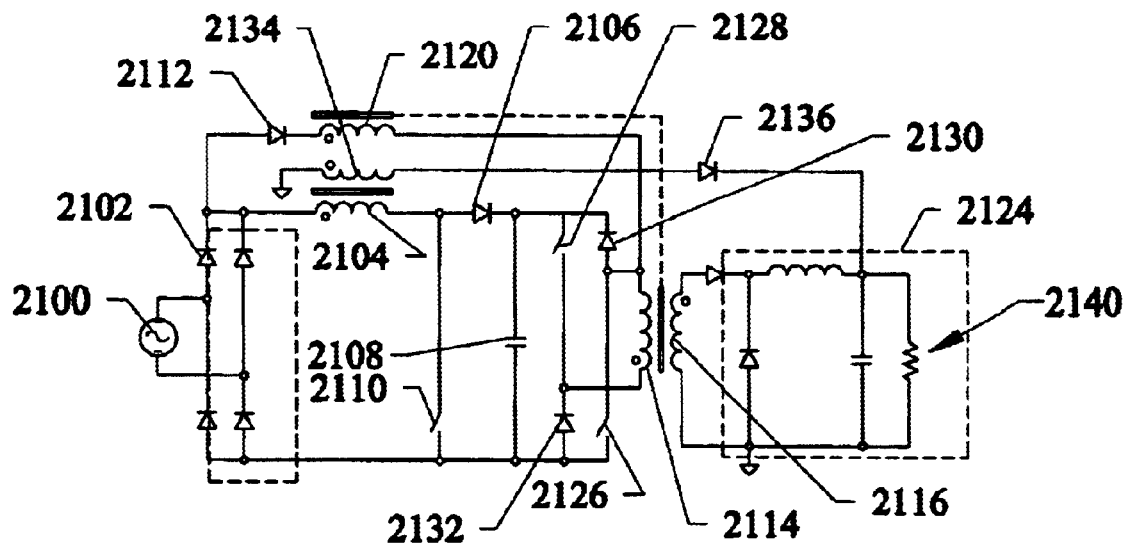

In FIG. 8b, the schematic shows the specific topology of combining a Boost PFC with a two switches forward cell modified according to the invention by providing extra winding 2120. As shown therein, the AC input 2100 is applied to rectifier 2102, and the rectifier output is connected to Flyback transformer winding 2104, diode 2106, switch 2110 and capacitor 2108, indicating a Boost PFC cell. The output of PFC cell is fed to the DC/DC cell, constituted by buffer capacitor 2108, switch 2126, 2128, diode 2130, 2132, Forward transformer 2114, 2116 and output circuitry 2124. The additional winding 2120 and diode 2112 are inserted between low side switch 2126 and positive output of rectifier 2102. Winding 2134, which is coupled with 2104, is serially connected with diode 2136 and thereafter is parallel connected with the output load 2140.

Figure 8C:
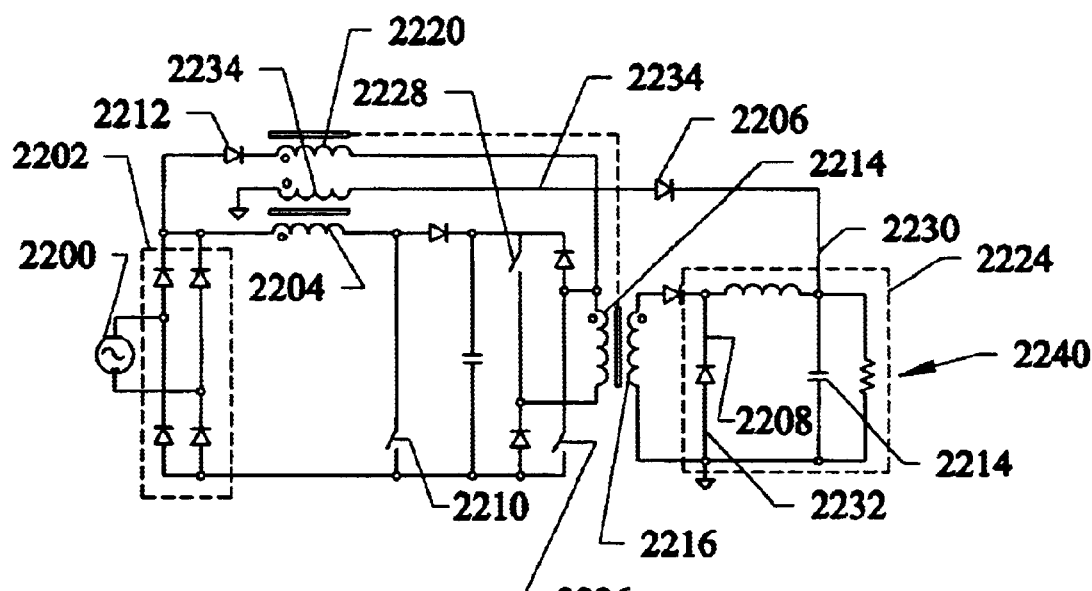
FIG. 8c shows an additional energy transferring winding added to the cell that combines a Boost PFC cell and two switch Flyback cell.

In FIG. 8c, the schematic shows the specific topology of combining a Boost PFC with a two switches Flyback cell modified according to the invention by providing extra winding 2220. As shown therein the AC input 2200 is applied to rectifier 2202, and the rectifier output is connected to inductor 2204, diode 2206, switch 2210 and capacitor 2208, indicating a Boost PFC cell. The output of PFC cell is fed to the DC/DC cell, constituted by buffer capacitor 2208, switch 2226, 2228, diode 2230, 2232, Flyback transformer 2214, 2216 and output circuitry 2224. The additional winding 2220 and diode 2212 are inserted between low side switch 2226 and positive output of rectifier 2202.

Figure 8D:
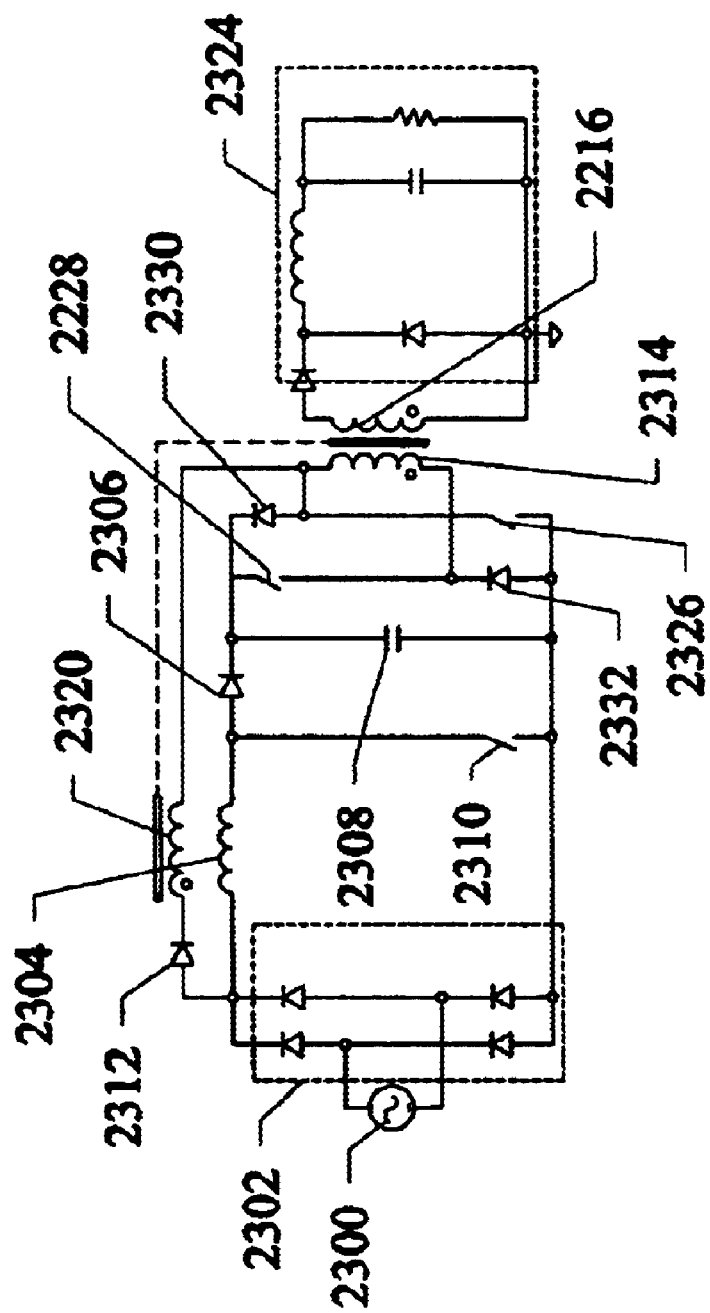
FIG. 8d is a schematic that uses the Flyback transformer to replace the Boost inductor in FIG. 8c.

In FIG. 8d, the schematic shows the specific topology of combining a Boost PFC with a two switches Flyback cell modified according to the invention by providing extra winding 2320. As shown therein the AC input 2300 is applied to rectifier 2302, and the rectifier output is connected to Flyback transformer winding 2304, diode 2306, switch 2310 and capacitor 2308, saying Boost PFC cell. The output of PFC cell is fed to the DC/DC cell, constituted by buffer capacitor 2308, switch 2326, 2328, diode 2330, 2332, Flyback transformer 2314, 2316 and output circuitry 2324. The additional winding 2320 and diode 2312 are inserted between low side switch 2326 and positive output of rectifier 2302. Winding 2334, which is coupled with 2304, is serially connected with diode 2336 and thereafter is parallel connected with the output load 2340.

The foregoing teaching of the invention clearly shows that the invention improves the efficiency along with high power factors and the reduction of harmonic distortion of the currents in the output of AC/DC power supplies.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A power-factor-correction (PFC) switching power supply apparatus that converts AC to DC and operates over a range of output currents comprising:
    (a) a power-factor-correction (PFC) cell having an alternating current input and a direct current output;
    (b) a direct current to direct current (DC/DC) cell having both a direct current input coupled to the direct current output of said power factor cell and to a direct current output; and,
    (c) means for transferring the direct current output of said rectified line power directly to the output side of the DC/DC cell when the line voltage exceeds a preset value whereby an operating mode is realized that provides higher overall efficiency with higher power factor and lower current harmonics of the AC to DC converted output currents.

2. The apparatus of claim 1 wherein said transferring means is by providing additional winding coupled to the DC/DC transformer connected to the rectified input side to provide a path for the energy transfer from the line to transfer to the output directly.

3. The apparatus of claim 1 wherein said transferring means is by providing an output transformer for the energy storage until its transfer from the line to the output directly.

4. The apparatus of claim 1 characterized in that power factor corrected cell and DC/DC cell include: a hybrid mode where the line power is transferred to the output side of the DC/DC cell when the line voltage exceeds a preset value, otherwise the output power DC/DC cell mainly comes from the energy buffered capacitor, which provides a coupling bus for the power factor correction cell and DC/DC cell cell.

5. The apparatus of claim 1 wherein said PFC cell is a Boost cell.

6. The apparatus of claim 5 wherein said PFC cell is a Boost PFC which includes a Flyback transformer.

7. The apparatus of claim 1 wherein said PFC cell is a Boost PFC combined with a forward transformer.

8. The apparatus of claim 1 wherein said PFC cell is a Boost PFC combined with a serial/parallel forward cell.

9. The apparatus of claim 1 wherein said PFC cell is a Boost PFC with a serial/parallel Flyback transformer cell.

10. The apparatus of claim 1 wherein said PFC cell is a Buck cell with a serial/parallel forward cell.

11. The apparatus of claim 1 wherein said PFC cell is a Buck and serial/parallel Flyback cell.

12. The apparatus of claim 1 wherein said PFC cell is a Boost PFC combined with a two switches forward cell.

13. The apparatus of claim 1 wherein said PFC cell is a Boost PFC combined with a two switches Flyback transformer cell.

14. A method for operating a power-factor-correction switching power supply that converts AC to DC and operates over a range of output currents, comprising the steps of:

(a) introducing an alternating current into a rectifier and then into a power-factor-correction (PFC) cell having a direct current output;

(b) coupling the current output of said power factor cell to a direct current output of a direct current (DC/DC) cell;

(c) coupling an output of the rectifier to the direct current input of said (DC/DC) cell; and, (d) sensing rectified line voltage variations for transferring the direct current output of said rectified line power directly to the output side of the DC/DC cell when the AC line voltage exceeds a preset value whereby an operating mode is realized that provides higher overall efficiency with higher power factor and lower current harmonics of the AC to DC converted output currents.

15. The method of claim 14 wherein said PFC cell is a Boost PFC which includes a Flyback transformer.

16. The method of claim 14 wherein said PFC cell is a Boost PFC combined with a forward transformer.

17. The method of claim 14 wherein said PFC cell is a Boost PFC combined with a serial/parallel forward cell.

18. The method of claim 14 wherein said PFC cell is a Boost PFC with a serial/parallel Flyback transformer cell.

19. The method of claim 14 wherein said PFC cell is a Buck and serial/parallel Flyback cell.

20. The method of providing a preset voltage value for transfer of energy from the rectified output of a PFC cell—DC/DC cell power supply by a transformer having secondary and primary windings directly to the input of the DC/DC cell comprising:

(a) means for determining when the AC line voltage exceeds a value which provokes said rectified value in excess of the present voltage;

(b) means for measuring the number of secondary windings of the transformer connected to said rectified output through a diode which passes said energy; and (c) means for measuring the number of primary windings used for transfer of energy to the input of said DC/DC cell whereby the preset value is obtained.

* * * * *